(12) United States Patent
de Boissieu et al.

(10) Patent No.: US 8,833,178 B2
(45) Date of Patent: Sep. 16, 2014

(54) DEVICE FOR THE TOUCH-SENSITIVE CHARACTERIZATION OF A SURFACE TEXTURE

(75) Inventors: Florian de Boissieu, Pont de Claix (FR); Bernard Guilhamat, Saint Michel de Saint Geoirs (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 365 days.

(21) Appl. No.: 13/255,806

(22) PCT Filed: Mar. 12, 2010

(86) PCT No.: PCT/EP2010/053178
§ 371 (c)(1),
(2), (4) Date: Nov. 22, 2011

(87) PCT Pub. No.: WO2010/103102
PCT Pub. Date: Sep. 16, 2010

(65) Prior Publication Data
US 2012/0118080 A1 May 17, 2012

(30) Foreign Application Priority Data
Mar. 12, 2009 (FR) ...................................... 09 51546

(51) Int. Cl.
*G01D 7/00* (2006.01)
*G01L 5/22* (2006.01)
*G01L 5/16* (2006.01)
*G01B 5/28* (2006.01)

(52) U.S. Cl.
CPC . *G01B 5/28* (2013.01); *G01L 5/226* (2013.01); *G01L 5/161* (2013.01)

USPC .......................................... 73/862.043; 73/760

(58) Field of Classification Search
USPC ................................ 73/760, 862.01–862.046
See application file for complete search history.

(56) References Cited

U.S. PATENT DOCUMENTS 4,709,342 A 11/1987 Hosoda et al.
4,748,672 A 5/1988 Nevill, Jr. et al.
(Continued)

FOREIGN PATENT DOCUMENTS

DE 102 52 862 B3 7/2004
DE 103 34 458 A1 3/2005
(Continued)

OTHER PUBLICATIONS

U.S. Appl. No. 13/319,260, filed Nov. 7, 2011, Boisssieu.
(Continued)

*Primary Examiner* — Max Noori
(74) *Attorney, Agent, or Firm* — Oblon, Spivak, McClelland, Maier & Neustadt, L.L.P.

(57) ABSTRACT

A device for a touch-sensitive characterization of surface texture is disclosed. According to one aspect, the device includes at least one three-axis force sensor at least partially covered by a coating structure including at least one first part placed against the sensor and at least a second part placed against the first part such that the first part is arranged between the sensor and the second part. The second part may include at least one protrusion arranged on a side opposite the first part and a shoulder arranged against a first face of the first part of the coating structure, located on the side opposite a second face of the first part placed against the sensor. The hardness of the material of the first part is lower than the hardness of the material of the second part.

20 Claims, 2 Drawing Sheets

(56) References Cited

U.S. PATENT DOCUMENTS

| | | | |
|---|---|---|---|
| 4,853,669 A * | 8/1989 | Guckel et al. | 338/4 |
| 5,421,213 A * | 6/1995 | Okada | 73/862.043 |
| 5,510,138 A * | 4/1996 | Sanftleben et al. | 427/96.4 |
| 5,812,163 A * | 9/1998 | Wong | 347/68 |
| 5,862,275 A * | 1/1999 | Takeuchi et al. | 385/19 |
| 6,278,180 B1 * | 8/2001 | Mizushima et al. | 257/700 |
| 6,492,762 B1 * | 12/2002 | Pant et al. | 310/334 |
| 6,622,575 B1 | 9/2003 | Nagata | |
| 7,170,668 B2 * | 1/2007 | Yun | 359/291 |
| 8,486,278 B2 * | 7/2013 | Pang et al. | 216/2 |
| 2005/0032322 A1 * | 2/2005 | Kim et al. | 438/301 |
| 2006/0146018 A1 * | 7/2006 | Arneson et al. | 345/161 |
| 2006/0169023 A1 | 8/2006 | David | |
| 2008/0257707 A1 * | 10/2008 | Murase et al. | 200/600 |
| 2009/0158864 A1 | 6/2009 | Hayakawa et al. | |
| 2009/0165569 A1 * | 7/2009 | Taya et al. | 73/862.041 |
| 2009/0320611 A1 | 12/2009 | Vásárhelyi et al. | |

FOREIGN PATENT DOCUMENTS

| | | |
|---|---|---|
| EP | 1 688 733 A1 | 8/2006 |
| JP | 04-48597 B2 | 8/1992 |
| JP | 07-55598 A | 3/1995 |
| JP | 2006-275979 A | 10/2006 |
| WO | WO 2005/085805 A1 | 9/2005 |
| WO | WO 2007/074891 A1 | 7/2007 |
| WO | WO 2008/065460 A1 | 6/2008 |

OTHER PUBLICATIONS

French Preliminary Search Report issued Nov. 2, 2009, in Patent Application No. 0951546, filed Mar. 12, 2009 (with Translation of Category of Cited Documents).

International Search Report issued Jun. 30, 2010 in Patent Application No. PCT/EP2010/053178.

Hyung-Kew Lee, et al., "A Modular Expandable Tactile Sensor Using Flexible Polymer", Micro Electro Mechanical Systems, 18$^{th}$ IEEE International Conference, XP010811930, Jan. 30, 2005, pp. 642-645.

Kang Ryeol Lee, et al., "Fabrication of Polymer-based Flexible Tactile Sensing Module with Metal Strain Gauges and Interconnecter", Sensors 2006, 5$^{th}$ IEEE Conference, XP031083126, Oct. 1, 2006, pp. 742-745.

Toshiharu Mukai, "Soft Areal Tactile Sensors with Embedded Semiconductor Pressure Sensors in a Structured Elastic Body", Sensors 2004, Proceedings of IEEE Vienna, XP010793712, Oct. 24, 2004, pp. 1518-1521.

Eun-Soo Hwang, et al., "A Polymer-Based Flexible Tactile Sensor for Normal and Shear Load Detection", Micro Electro Mechanical Systems, 19$^{th}$ IEEE International Conference, XP010914345, Jan. 22, 2006, pp. 714-717.

Bart J. Kane, et al., "A Traction Stress Sensor Array for Use in High-Resolution Robotic Tactile Imaging", Journal of Microelectromechanical Systems, IEEE Service Center, vol. 9, No. 4, XP011034591, Dec. 2000, pp. 425-434.

J. Scheibert, et al., "The Role of Fingerprints in the Coding of Tactile Information Probed with a Biomimetric Sensor", Sciencexpress Report, Jan. 29, 2009, 9 pgs.

F. De Boissieu, et al., "Texture Exploration with an Artificial Finger", Materials & Sensations 2008, Oct. 22-24, 2008, p. 1-4.

Yuka Mukaibo, et al., "Development of a Texture Sensor Emulating the Tissue Structure and Perceptual Mechanism of Human Fingers" Proceedings of the 2005 IEEE International Conference on Robotics and Automation, Apr. 2005, pp. 2576-2581.

Lucia Beccai, et al., "Design and fabrication of a hybrid silicon three-axial force sensor for biomechanical applications", Sensors and Actuators A, vol. 120, No. 2, XP25325091A, May 17, 2005, pp. 370-382.

Lucia Beccai, et al., "Development and Experimental Analysis of a Soft Compliant Tactile Microsensor for Anthropomorphic Artificial Hand", IEEE/Asme Transactions on Mechatronics, IEEE Service Center, vol. 13, No. 2, XP11207610A, Apr. 1, 2008, pp. 158-168.

Koh Hosoda, et al., "Anthropomorphic robotic soft fingertip with randomly distributed receptors", Robotics and Autonomous Systems, vol. 54, 2006, pp. 104-109.

Robert D. Howe, et al., "Dynamic Tactile Sensing: Perception of Fine Surface Features with Stress Rate Sensing", IEEE Transactions on Robotics and Automation, vol. 9, No. 2, Apr. 1993, pp. 140-151.

Kunnyun Kim, et al., "A Silicon-based flexible tactile sensor for ubiquitous robot companion applications", Journal of Physics: Conference Series, Institute of Physics Publishing, vol. 34, Apr. 1, 2006, pp. 399-403.

Takashi Maeno, et al., "Geometry Design of an Elastic Finger-Shaped Sensor for Estimating Friction Coefficient by Pressing an Object", Proceedings IEEE International Conference on Robotics and Automation, 2003, pp. 1533-1538.

Mami Tanaka, et al., "Active haptic sensation for monitoring skin conditions", Journal of Materials Processing Technology, vol. 161, 2005, pp. 199-203.

Gábor Vásárhelyi, et al., "Characterization of an Integrable Single-Crystalline 3-D Tactile Sensor", IEEE Sensors Journal, vol. 6, No. 4, Aug. 2006, pp. 928-934.

C.T. Yao, et al., "A Novel Three-Dimensional Microstructure Fabrication Technique for a Triaxial Tactile Sensor Array", Proceedings of the IEEE Micro-Robotics and Teleoperators Workshop, 1987, 6 pgs.

U.S. Appl. No. 13/898,644, filed May 21, 2013, Godin, et al.

Notice of Allowance issued Dec. 3, 2013 in Japanese Patent Application No. 2011-553468 (with English language Note and Claims).

* cited by examiner

DEVICE FOR THE TOUCH-SENSITIVE CHARACTERIZATION OF A SURFACE TEXTURE

RELATED APPLICATIONS

This application is a U.S. National Phase of International Application No.: PCT/EP2010/053178, filed Mar. 12, 2010, which claims the benefit of French Patent Application No. 09 51546 filed Mar. 12, 2009, each of which is included by reference in their entirety.

FIELD OF THE INVENTION

The invention relates to a device for touch-sensitive characterisation of surface texture to enable exploration and characterisation of a plane or non-plane surface texture. The invention can be applied to any field related to manufacturing of products for which touch-sensitive characteristics are important. For example, the invention can be applied to the paper, textile, automobile, food processing or even cosmetics industry to:
  estimate sensations perceived by the consumer for a new product,
  verify touch-sensitive properties of a product after manufacturing (quality control),
  evaluate the variation in touch-sensitive perceptions as a function of the different compositions or methods of manufacturing the product.

The invention can also be applied to the field of robotics to provide a robot with a sense of touch, or biomimetics, for example to make active prostheses or for remote medical operations to allow the surgeon to have some touch-sensitive sensation during a remote operation.

BACKGROUND OF THE INVENTION

The "A traction Stress Sensor Array for Use in High-Resolution Robotic Tactil Imaging" document by B. J. Kane et al., Journal of Microelectromechanical Systems, vol. 9.4, 2000, describes a device for touch-sensitive characterisation of a surface texture comprising a force sensor coated with a parallelepiped layer composed of a soft elastomer (40 Shore A). This elastomer layer can protect the sensor mechanically while transmitting relief perceived during a surface exploration to it.

One particular disadvantage of such a device is that the contact area between the studied test piece and the coating layer of the sensor is badly determined and is highly dependent on the roughness of the test piece. Thus, it is difficult to make a precise analysis of the texture of the explored surface. Furthermore, wear of this coating creates problems for the reproducibility of measurements during time and it is not easy to replace it when it becomes worn.

The "The Role of Fingerprints in the Coding of Tactile Information Probed with a Biomimetic Sensor" document by J. Scheibert et al., Science Report, Jan. 29, 2009, discloses a coating of a hemi-spherical shaped three-axis force sensor in a device for touch-sensitive characterisation of a surface texture. Although the contact area between the device and a test piece is determined more easily than with the device mentioned above, this device does not solve all problems related to wear of the coating layer during characterisation of the texture of a surface of this test piece, because large changes in the contact area between the test piece and the coating occur after the device has been used several times, due to the large radius of curvature of this coating.

SUMMARY AND DESCRIPTION OF ASPECTS OF THE INVENTION

One purpose of this invention is to propose a device for touch-sensitive characterisation of the surface texture to adapt to any type of surface and to make pressure and friction force measurements during exploration of a surface while offering good reproducibility of measurements in time, and for which measurements are independent of the sensor wear.

To achieve this, this invention discloses a device for touch-sensitive characterisation of surface texture comprising at least one three-axis force sensor at least partially covered by a coating structure comprising at least one first part placed against the sensor and at least one second part placed against the first part such that the first part is arranged between the sensor and the second part, the second part comprising at least one protrusion arranged on a side opposite the first part and a shoulder arranged against a first face of the first part of the coating structure located on the side opposite a second face of the first part placed against the sensor, the hardness of the material of the first part being lower than the hardness of the material of the second part.

Therefore, this device can be used to make an exploration and characterisation of any type of surface. The two-part coating structure can also transmit forces from the contact area between the coating structure and the studied surface to the sensor that can be controlled and adapted to the sensitivity of the sensor as a function of the nature and roughness of the studied surface.

Such a coating structure can also provide good protection for the sensor while forming an optimum interface between the studied surface and the sensor due to the protrusion, which is the part in contact with the studied surface, for which the shape and the dimensions are perfectly defined. Thus, when the protrusion becomes worn, considering that the contact area can be determined as a function of the pressure applied on the device, this contact area can therefore be constant regardless of the size of the section of the protrusion. The result is very good reproducibility of the measurements made.

Furthermore, the difference in the hardness of the materials from which the two parts of the coating structure are made (the part in contact with the studied surface being the hardest), can give a good transfer of forces to the sensor and a good simulation of the "touch" sensation of the surface studied by the device.

The hardness of the material of the second part, and particularly of the protrusion, that is greater than the hardness of the material of the first part, is chosen to minimise wear of the coating structure (particularly the protrusion). When the section is constant over the entire height of the protrusion, for example when the protrusion is approximately cylindrical in shape, this makes it possible to keep a constant contact area regardless of the wear of the protrusion.

Finally, considering that the hardness of the first part of the coating structure is lower than the hardness of the second part of the coating structure, this first part can dampen any shocks that may be applied to the device, for example when the device is put into contact with the studied surface.

Therefore, the invention can be used to explore any type of surface, to maximise the transmission of forces to the sensor while protecting it and minimising the effects of wear to enable better reproducibility of measurements.

Since the force sensor is three-axis, it is possible to detect normal and tangential forces applied to the protrusion and transmitted to the sensor, and therefore to detect any contact force applied to the protrusion regardless of its orientation in space.

The shoulder also helps to optimise transmission of forces from the protrusion to the sensor, and particularly tangential forces.

A touch-sensitive device for characterisation of the surface texture is also disclosed comprising at least one force sensor at least partially covered by a coating structure comprising at least one first part placed against the sensor and at least one second part placed against the first part such that the first part is arranged between the sensor and the second part, the second part comprising at least one protrusion arranged on a side opposite the first part, the hardness of the material of the first part being lower than the hardness of the material of the second part.

The protrusion of the second part of the coating structure may be approximately cylindrical and/or it may comprise an end with an approximately semi-cylindrical shape and/or it may have an aspect ratio equal to approximately 1. The contact area of the end with an approximately hemi-spherical shape may be even better defined as a function of the contact pressure of the device on the studied surface. The aspect ratio of the protrusion may also be chosen such that the protrusion does not deflect when it is displaced on the surface to be characterised, so that some linearity can be obtained between components of the forces at the surface of the coating and measurements made by the sensor.

The second part of the coating structure may comprise a shoulder placed against a first face of the first part of the coating structure located on the side opposite a second face of the first part placed against the sensor.

The shoulder may entirely cover said first face of the first part of the coating structure, and/or it may be approximately in the shape of a truncated cone comprising a section on one side approximately similar to the section of the protrusion and on a second side opposite the first side, a section approximately similar to the section of the first face of the first part of the coating structure. When the shoulder entirely covers said first face of the first part of the coating structure, the result is better transmission of stresses from the protrusion to the first part of the coating structure, and therefore to the sensor.

The first part of the coating structure may be approximately cylindrical in shape and/or the dimensions of its section in a plane parallel to a face of said first part in contact with the second part, may be larger than the dimensions of the first part along an axis perpendicular to said section.

When the shape of the first part of the coating structure is approximately cylindrical, the radius $R_b$ of the section of the cylinder may be such that:

$$R_b > \sqrt{\frac{F_{Nmax}}{\pi \cdot P_{max}}}$$

where $F_{Nmax}$: maximum pressure force applied on the device during characterisation of a surface texture;

$P_{max}$: maximum pressure supported by the sensor.

The material from which the first part of the coating structure and/or the material of the second part of the coating structure are made may be composed of an elastomer, for example polyurethane. Furthermore, by making the two parts of the coating structure from the same material, for example polyurethane, the result is good cohesion of these two parts to each other, which can prevent problems with the separation of these two parts during use of the device.

The hardness of the material from which the first part of the coating structure is made and/or the hardness of the material from which the second part of the coating structure is made may be between about 10 and 100 Shore A and/or may be greater than or equal to about 10 Shore A and/or the difference between them may be between about 20 and 30 Shore A.

The sensor may be placed against or embedded in a support composed of a material with a hardness that may be greater than the hardnesses of the materials of the coating structure.

The first part of the coating structure may cover the sensor entirely and at least part of the support.

The force sensor may be a three-axis force sensor.

The force sensor may comprise at least one deformable membrane and one rod mechanically connected to the deformable membrane.

In this case, the rod of the sensor may be arranged at least partly in the first part of the coating structure, which can improve the transmission of forces to the sensor.

The device may also comprise a prehensile body, the sensor and the coating structure possibly being located at one end of said prehensile body.

The invention also relates to a method for making a device for characterisation of a surface texture, comprising at least one moulding of a first part of a coating structure intended to at least partly cover a three-axis force sensor, said first part being placed against the sensor, and moulding of at least one second part of the coating structure placed against the first part such that the first part is between the sensor and the second part, the second part comprising at least one protrusion arranged on a side opposite the first part and a shoulder placed against a first face of the first part of the coating structure located on the side opposite a second face of the first part against the sensor, the hardness of the material of the first part being lower than the hardness of the material of the second part.

It also discloses a method for making a device for characterisation of a surface texture, comprising at least one moulding of a first part of a coating structure that will at least partly cover a force sensor, said first part being placed against the sensor, and moulding of at least one second part of the coating structure against the first part such that the first part is between the sensor and the second part, the second part comprising at least one protrusion arranged on a side opposite the first part, the hardness of the material of the first part being lower than the hardness of the material of the second part.

The second part of the coating structure may be moulded before the first part of the coating structure is moulded, these two mouldings could be obtained at least by applying the following steps:

fill a part of a mould, the shape of which corresponds to the shape of the coating structure with the material of the second part in liquid form, partial solidification of the second part of the coating structure, fill the remainder of the mould with the material of the first part in liquid form on the partially solidified second part, placement of the first part of the coating structure against the sensor.

In one variant, the first part of the coating structure may be moulded before the second part of the coating structure is moulded, these two mouldings possibly being obtained at least by applying the following steps:

fill part or all of a mould placed on the sensor, with the shape corresponding to the shape of the coating structure, with the material of the first part in liquid form, partial solidification of the material previously poured into the mould, cut out the partially solidified material, forming the first part of the coating structure, fill the remainder of the mould with the material of the second part in liquid form.

Materials poured into the mould may be solidified in a drying oven.

Moulded materials may be composed of elastomer and may be degassed under a vacuum bell before the moulding steps are carried out.

BRIEF DESCRIPTION OF THE DRAWINGS

This invention will be better understood after reading the description of example embodiments given for purely informative reasons and that are in no way limitative with reference to the appended drawings in which.

Identical, similar or equivalent parts of the different figures described below have the same numeric references so as to facilitate the correspondence between the different figures.

The different parts shown in the figures are not necessarily all shown at the same scale, to make the figures more easily understandable.

The various possibilities (variants and embodiments) should be understood as being non-exclusive of each other and they may be combined with each other.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DETAILED DESCRIPTION OF CERTAIN EMBODIMENTS

Figure 1:
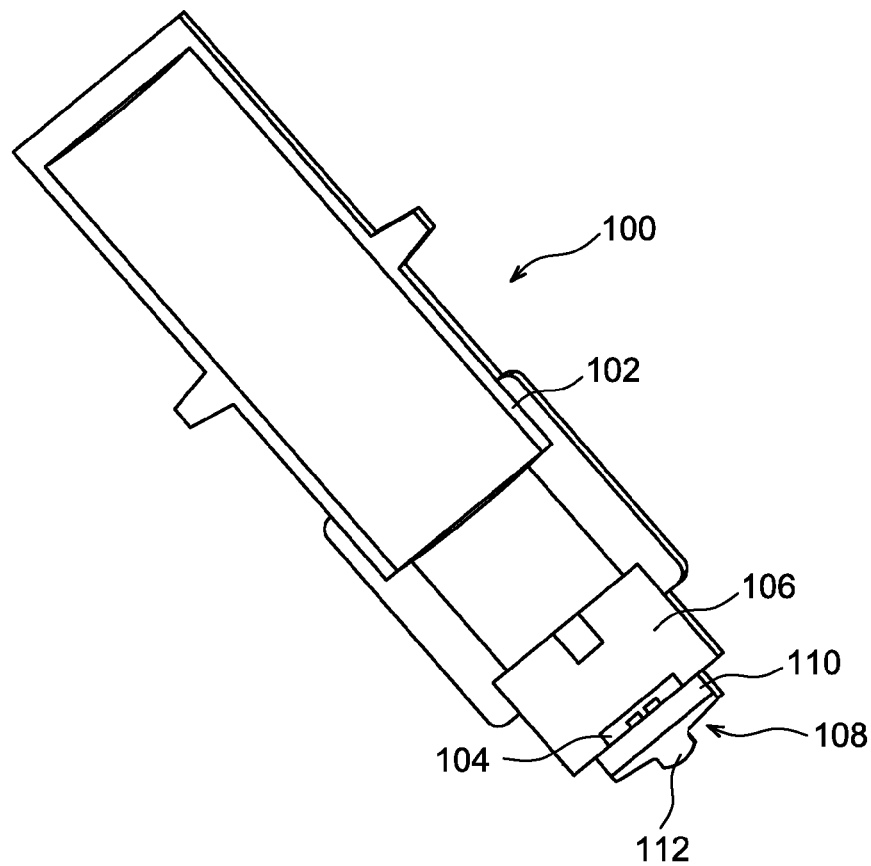
FIG. 1 shows a particular embodiment of a device for touch-sensitive characterisation of a surface texture according to this invention.

Refer firstly to FIG. 1 that shows a sectional view of a particular embodiment of a touch-sensitive surface texture characterisation device 100.

In this case the device 100 is an artificial finger and comprises a prehensile body 102.

The device 100 comprises a three-axis force sensor 104, for example of the MEMS type and is composed of silicon. In this embodiment, the sensor 104 is embedded at one face of a plane support 106 composed of a hard material, for example epoxy resin. The sensor 104 is covered by a coating structure 108 comprising a first part 110 against the sensor 104 and the plane support 106, and a second part 112 covering the first part 110 of the coating structure 108.

Figure 2:
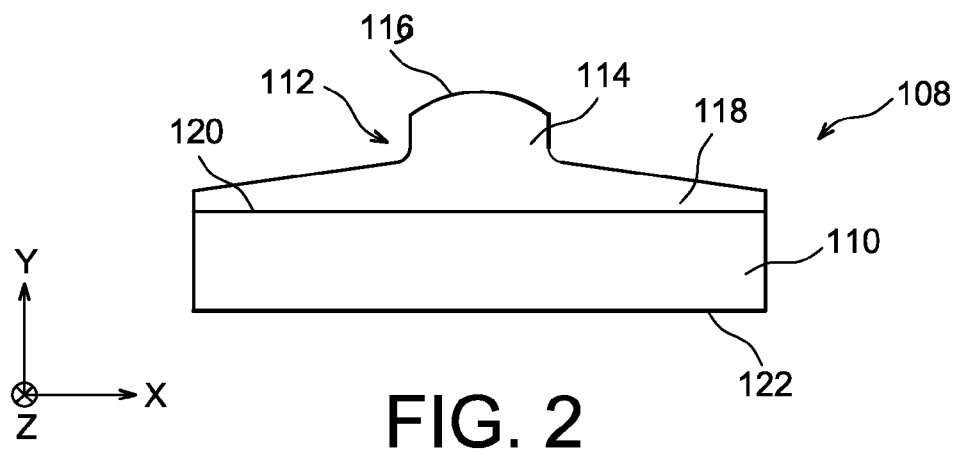
FIG. 2 shows a coating structure of a sensor used in a touch-sensitive surface texture characterisation device according to the particular embodiment of this invention shown in FIG. 1, FIGS. 3 and 4 show an example three-axis sensor of a touch-sensitive surface texture characterisation device according to this invention.

Now refer to FIG. 2 that shows a detailed sectional view of the coating structure 108. The second part 112 of the coating structure 108 is composed of an approximately cylindrically protrusion 114, forming a tip and comprising a disk-shaped section in the (X,Z) plane shown in FIG. 2. The protrusion 114 comprises a rounded end 116, for example hemi-spherical.

The protrusion 114, and more particularly the end 116 of the protrusion 114, is the part that is in contact with the surface of the studied test piece and that defines the contact area with the studied test piece.

The second part 112 of the coating structure 108 also comprises a shoulder 118 on which the protrusion 114 is arranged. In this case, this shoulder 118 is conical, concave and asymptotically cylindrical, forming a junction between the protrusion 114 and the first part 110 of the coating structure 108, and it transfers forces applied by the protrusion 114 to the first part 110 of the coating structure 108. This shoulder 118 extends over the entire surface of a first face 120 of the first part 110 of the coating structure 108, which firstly optimises transmission of stresses from the protrusion 114 to the first part 110 of the coating structure 108, and secondly minimises torsion or bending problems of the protrusion 114 that might occur during displacement of the device 100 on the surface of the studied sample.

The second part 112 of the coating structure 108 is the part of the device 100 that resists friction with the surface of the studied test piece. Therefore the material of the second part 112 is chosen so that it has sufficient hardness to minimise wear, but it remains soft enough to have a contact area that is not reduced to a point and so that friction forces can be created on the sensor 104 during exploration of the studied test piece.

The rounded end 116 of the protrusion 114 has a well-defined contact area as a function of the contact pressure applied to the device 100. Thus, starting from a given pressure, the value of which depends on the hardness of the material from which the second part 112 of the coating structure 108 is made, the contact area between the end 116 of the protrusion 114 and the surface of the studied test piece remains constant, regardless of the size of the section of the protrusion 114. The dimensions of the section of the protrusion 114, and therefore the end 116, are for example chosen as a function of the size of the roughness of the surface of the inspected test piece. Furthermore, the cylindrical shape of the protrusion 114, for which the aspect ratio may for example be equal to 1 (in this case the cylinder diameter in the (X,Z) plane being approximately equal to the height of the cylinder, in other words the dimension along the Y axis), so that it has sufficient mechanical strength to prevent bending as it comes into contact with the surface of the test piece or as it is moved across the surface of the test piece. Finally, considering that the dimensions of the section of the protrusion 114 in the (X,Z) plane are approximately the same over the entire height (dimension along the Y axis) of the protrusion 114, it is possible to maintain a constant contact area even when the protrusion 114 is worn (in this case wear effectively reduces the height of the protrusion 114).

In general, for the first part 110 and the second part 112 of the coating structure 108, the width of the part (dimension in the (X,Z) plane, for example the diameter) may preferably be greater than the height of the part (dimension along the Y axis). The aspect ratio (width/height) of the first part 110 may for example be equal to approximately 5.

The size of the contact area of the protrusion 114 generated as the coating is compressed may be chosen to be sufficiently small to detect roughnesses larger than the size of this area (for example of the order of 1 mm diameter). The size of the protrusion 114 is also adapted to the explored roughnesses, such that the end of the protrusion 114 is in contact with the test piece rather than another part (the side or the bottom of the protrusion, for example if the roughnesses are larger than about 3 mm and deeper than about 1 mm, and for example comprise sharp edges. For example, for paper, fabric or other material test pieces with "average" or "fine" roughness (diameter less than about 3 mm), the protrusion 114 may be sized such that the contact area is of the order of 1 mm, and it comprises a rounded shoulder.

Figure 3:
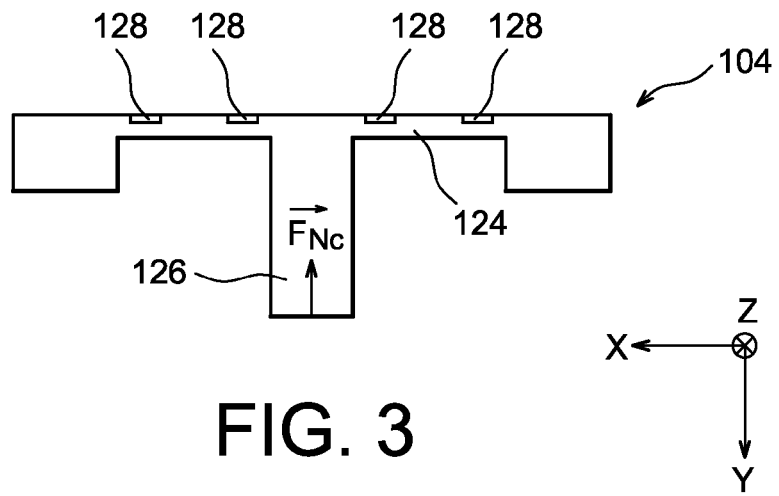

FIG. 3 shows details of an example of a sensor 104 of the device 100. This sensor 104 comprises a deformable membrane 124 provided with a rod 126 at its centre. The rod 126 is placed against or inside a second face 122 of the first part 110 of the coating structure 108 and it transmits perceived contact forces to the rod 126. Preferably, the rod 126 may be "moulded" in the first part 110 of the coating structure 108, in other words arranged inside this first part 110 in order to optimise the transmission of forces from the coating structure 108 to the sensor 104. Considering the deformation applied to the coating structure 108 due to the contact force applied to its surface, the rod 126 will resist this force applied and deform the membrane 124 due to the stresses and the displacement induced at the centre of the membrane 124 by the rod 126. The deformation of the membrane 124 by the rod 126 is measured by transduction means 128 such as piezoresistive strain gauges or capacitance variation detectors placed on the membrane 124.

Figure 4:
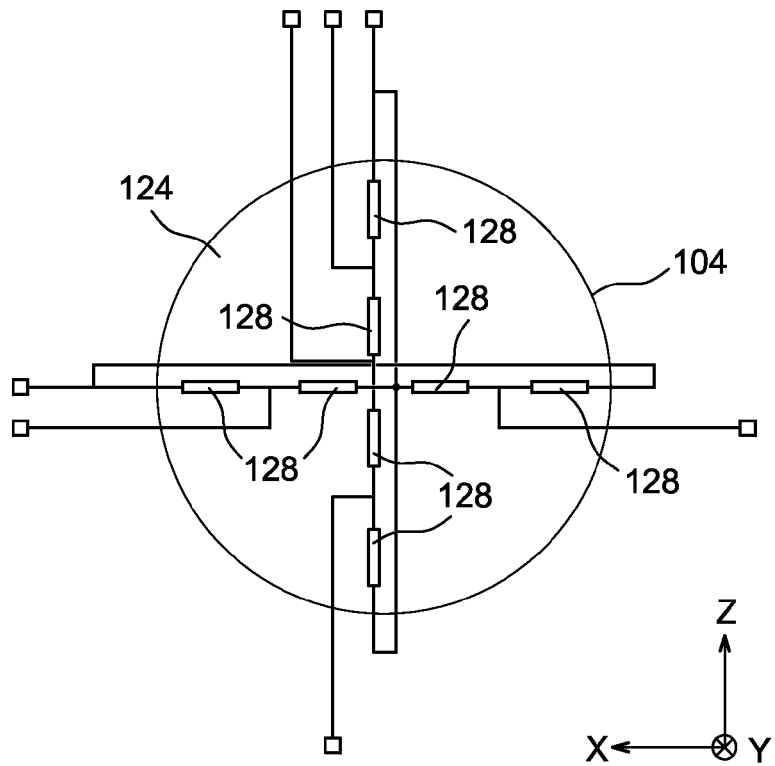

In this particular embodiment, the strain gauges 128 (there are eight of them) form two Wheatstone bridges like that shown on the example in FIG. 4. In this figure, the membrane 124 as seen in a top view forms a disk in the (X,Z) plane. Four first strain gauges 128 are arranged along a horizontal axis (parallel to the X axis) passing through the centre of the disk formed by the membrane 124 and aligned along a first direction. These first four strain gauges 128 are connected to each other by interconnections and form a first Wheatstone bridge. Other interconnections also connect these first four strain gauges 128 to four electrical contacts forming the inputs and outputs of this first Wheatstone bridge. Four second strain gauges 128 are arranged along a vertical axis (parallel to the Z axis) passing through the centre of the disk formed by the membrane 124 and aligned along a second direction perpendicular to the first direction. These four second strain gauges 128 are connected to each other through interconnections and form a second Wheatstone bridge. Other interconnections also connect these four second strain gauges 128 to three other electrical contacts forming inputs and outputs for this second Wheatstone bridge. For example, the strain gauges 128 may be rectangular cuboid with their longest dimension parallel to the first or the second direction.

In the particular embodiment described herein, the first part 110 of the coating structure 108 is approximately cylindrical in shape. The second face 122 of the first part 110 of the coating structure 108 is in contact with the sensor 104 and its dimensions are larger than the dimensions of the sensor 104 and in particular are larger than the dimensions of the deformable membrane 124 of the sensor 104. Therefore, the first part 110 of the coating structure 108 covers the sensor 104 and a part of the support 106 peripheral to the sensor 104. The ratio between the sectional area $S_c$ of the membrane 124 of the sensor 104 in the (X,Z) plane, and the sectional area $S_b$ of first part 110 of the coating structure 108 also in the (X,Z) plane, helps to define a proportionality factor between a force $F_{Nc}$ perceived by the sensor 104 parallel to the Y axis perpendicular to the plane of the membrane 124 and shown in FIG. 3, and a force $F_{Nb}$ applied on the protrusion 114 along the same direction as the force $F_{Nc}$, in other words parallel to the Y axis, such that $$F_{Nc} = \frac{S_c}{S_b} F_{Nb},$$

or $$P = \frac{F_{Nc}}{S_c} = \frac{F_{Nb}}{S_b}$$

where P is the pressure at the interface between the sensor 104 and the coating structure 108.

Similarly, a proportionality ratio can be defined between a tangential force $F_{Tc}$ perceived by the sensor 104 along an axis in the (X,Z) plane parallel to the plane of the membrane 124, and a force $F_{Tb}$ applied on the protrusion 114 along the same direction as the force $F_{Tc}$, in other words parallel to the (X,Z), plane such that $$F_{Tc} = k * \frac{S_c}{S_b} F_{Tb},$$

or $$\sigma = \frac{F_{Tc}}{S_c} = k * \frac{F_{Tb}}{S_b}$$

where σ is the tangential stress at the interface between the sensor 104 and the coating structure 108, and k is a multiplication factor defined by the height of the rod used as a lever arm and the ratio of the hardnesses of the first part 110 and the second part 112 of the coating structure 108.

The material used for the first part 110 of the coating structure 108 is chosen such that its hardness is lower than the hardness of the material used for the second part 112 of the coating structure 108, particularly so as to dampen the shocks that could be applied to the protrusion 114, for example when the protrusion 114 comes into contact with the studied test piece, and thus not transmit these shocks to the sensor 104. This hardness of the material from which the first part 110 of the coating structure 108 is made, which is lower than the hardness of the material from which the second part 112 of the coating structure 108 is made, also amplifies the lateral deformations originating from the second part 112 of the coating structure 108 and thus increases the perception of tangential forces transmitted to the rod 126 of the force sensor 104. The first part 110 and the second part 112 of the coating structure 108 may for example be composed of an elastomer such as polyurethane, the hardness of which may for example be between about 10 and 100 Shore A. Furthermore, these materials will preferably be chosen such that the difference between the hardnesses of the materials from which the first part 110 of the coating structure 108 and the second part 112 of the coating structure 108 are made is between about 20 and 30 shore A.

We will now describe an example embodiment of the device 100 to characterise the surface of a fabric with a mesh size of the order of 1 mm. The diameter of the protrusion 114 is equal to about 3 mm so that the protrusion 114 does not get trapped in the mesh of the fabric. The material from which the protrusion 114 is made, in other words in this case the material of the second part 112 of the coating structure 108 is composed of polyurethane with a hardness of about 80 Shore A, which reduces abrasion of the protrusion 114 when the protrusion is moved on this type of test piece. The first part 110 of the coating structure 108 is also composed of polyurethane but its hardness is equal to about 50 Shore A and is therefore lower than the hardness of the material in the second part 112 of the coating structure 108. By choosing materials of the same nature (polyurethane) to make the two parts 110 and 112 of the coating structure 108, the result is good cohesion between these elements, thus avoiding possible separation of these two parts 110, 112 during displacement of the device 100 on the fabric. In one variant, the materials used to make the first part 110 and the second part 112 of the coating structure 108 could be composed of polydimethylsiloxane (PDMS), or more generally composed of at least one appropriate elastomer.

The dimensions of the coating structure 108 and particularly the dimensions of the first part 110 are chosen as a function of forces that will be applied to the coating structure 108. If a maximum normal force $F_{Nmax}$ (force oriented parallel to the Y axis) is intended to be applied onto the coating structure 108 (and therefore onto the protrusion 114) during exploration of a test piece, the sectional area $S_b$ of the first part 110, corresponding to the surface of the faces 120 and 122 of the first part 110, is chosen such that:

$$\frac{F_{Nmax}}{S_b} < P_{max}$$

namely for the radius of a section of the first part 110 in the form of a disk:

$$R_b > \sqrt{\frac{F_{Nmax}}{\pi \cdot P_{max}}} \ .$$

The three-axis force sensor 104 used in this case resists a maximum pressure $P_{max}=10$ bars$=10^6$ N/m$^2$. Thus, for a maximum force $F_{Nmax}=10$ N, we will choose Rb>1.8 mm.

Similarly, if a maximum tangential force $F_{Tmax}$ is intended to be applied onto the coating structure 108 (and therefore onto the protrusion 114), the radius Rb of the first part 110 in the form of a disk is chosen such that:

$$R_b > \sqrt{k * \frac{F_{Tmax}}{\pi \cdot \sigma_{max}}}$$

In one variant of the device 100, it is possible that the sensor 104 is not a three-axis force sensor, but it may for example be a two-axis force sensor capable of measuring at least the tangential force applied by the protrusion 114 as it is displaced on a test piece. Furthermore, when the forces to be measured are very small, the size of the coating structure can be reduced to obtain a coating structure 108 that does not entirely cover the sensor 104 by the first part 110 of the coating structure 108.

The elements of the coating structure 108 (first part 110 and second part 112) may for example be made by moulding. When these elements are composed of an elastomer, the first step is to mix the two liquid components (resin+hardener) used to obtain the elastomer. The next step is to degas the mix under a vacuum bell to prevent the formation of bubbles in this mix which would modify the mechanical properties of the elastomer.

The first part 110 and the second part 112 of the coating structure 108 may be made in the same mould. In this case, the second part 112 will be made first by injecting the exact quantity of material into the mould to form the second part 112, for example using a syringe. When the second part starts to cross-link, the material from which the first part 110 is made is then poured on top of the second part 112 already in the mould without waiting for complete polymerisation, and is placed above the support 106 in which the sensor 104 is embedded, thus closing the mould. The mould is then removed after solidification of the coating structure 108.

In one variant embodiment, a first moulding is done in which the sensor 104 is covered with an elastomer that is the material from which the first part 110 of the coating structure 108 is made. Once the first material has cross-linked, the surplus material (in other words the top edge of the structure obtained) is cut off to form the first part 110 of the coating structure 108. The remainder of the mould is then filled with the material of the second part 112 of the coating structure 108. The mould is then removed after solidification of the coating structure 108. This technique may be used in particular when the second part 112 of the coating structure 108 is to be replaced, for example when it is worn to the extent that the protrusion 114 has completely disappeared.

What is claimed is:

1. A device for touch-sensitive characterization of surface texture, the device comprising;
   at least one three-axis force sensor; and
   a coating structure, the force sensor being at least partially covered by the coating structure,
   wherein the coating structure comprises at least one first part placed against the sensor and at least one second part placed against the first part such that the first part is arranged between the sensor and the second part,
   wherein the second part comprises at least one protrusion arranged on a side opposite the first part and a shoulder arranged against a first face of the first part of the coating structure located on the side opposite a second face of the first part placed against the sensor, and
   wherein a hardness of a material of the first part is less than a hardness of a material of the second part.

2. The device according to claim 1, wherein the protrusion includes at least one of an approximately cylindrical shape, an approximately hemi-spherical end, and an aspect ratio equal to about 1.

3. The device according to claim 1, wherein the shoulder fully covers said first face.

4. The device according to claim 1, wherein the first part of the coating structure has an approximately cylindrical shape.

5. The device according to claim 4, wherein a radius $R_b$ of the section of the cylinder is such that:

$$R_b > \sqrt{\frac{F_{Nmax}}{\pi \cdot P_{max}}}$$

wherein $F_{Nmax}$ is a maximum pressure force applied on the device during characterisation of a surface texture, and
wherein $P_{max}$ is a maximum pressure supported by the sensor.

6. The device according to claim 1, wherein at least one of the material forming the first part of the coating structure and the material forming the second part of the coating structure comprises an elastomer.

7. The device according to claim 1, wherein at least one of the hardness of the material forming the first part of the coating structure and the hardness of the material forming the second part of the coating structure is between about 10 and about 100 Shore A.

8. The device according to claim 1, wherein the sensor is placed against or embedded in a support composed of a material with a hardness greater than the hardness of any materials of the coating structure.

9. The device according to claim 8, wherein the first part entirely covers the sensor and at least part of the support.

10. The device according to claim 1, wherein the force sensor comprises at least one deformable membrane and a rod mechanically connected to the deformable membrane.

11. The device according to claim 10, wherein the rod of the sensor is arranged at least partially in the first part of the coating structure.

12. The device according to claim 1, further comprising a prehensile body, the sensor and the coating structure being located at one end of said prehensile body.

13. A method for manufacturing a device for characterization of a surface texture, the method comprising:
    molding a first part of a coating structure intended to at least partially cover a three-axis force sensor, said first part being placed against the sensor; and
    molding at least one second part of the coating structure placed against the first part such that the first part is arranged between the sensor and the second part,
    wherein the second part comprises at least one protrusion arranged on a side opposite the first part and a shoulder placed against a first face of the first part of the coating structure located on the side opposite a second face of the first part placed against the sensor, and
    wherein a hardness of a material of the first part is less than a hardness of a material of the second part.

14. The method according to claim 13, wherein the second part of the coating structure is molded before the first part of the coating structure is molded, the method further comprising:
    filling a part of a mold having a shape that corresponds to a shape of the coating structure with a liquid material for forming the second part;
    partially solidifying the liquid material for forming the second part in the mold to form a partially solidified second part;
    filling the remainder of the mold with a liquid material for forming the first part, the liquid material for forming the first part being in contact with the partially solidified second part; and
    placing the first part of the coating structure against the sensor.

15. The method according to claim 13, wherein the first part of the coating structure is molded before the second part of the coating structure is molded, the method further comprising:
    filling a part or all of a mold placed on the sensor with a liquid material for forming the first part, the mold having a shape corresponding to a shape of the coating structure;
    partially solidifying the liquid material for forming the first part in the mold to form a partially solidified first part;
    removing at least a portion of the partially solidified first part from the mold; and
    filling the remainder of the mold with a liquid material for forming the second part.

16. The method according to claim 14, wherein the materials poured in the mold are solidified in a drying oven.

17. The method according to claim 13, wherein the molded materials comprise elastomer and are degassed under a vacuum bell before the molding steps are carried out.

18. The device according to claim 1, wherein the shoulder is approximately in a shape of a truncated cone comprising a section on one side approximately similar to the section of the protrusion and on a second side opposite the first side, a section approximately similar to the section of the first face.

19. The device according to claim 1, wherein a section in a plane parallel to a face of the first part in contact with the second part, with dimensions larger than the dimension of the first part along an axis perpendicular to the section.

20. The device according to claim 1, wherein the difference between the hardness of a material forming the first part and the hardness of a material forming the second part is between about 20 and 30 Shore A.

* * * * *